United States Patent
Toennessen

(10) Patent No.: US 8,228,756 B2
(45) Date of Patent: Jul. 24, 2012

(54) APPARATUS AND METHODS FOR CONTROLLING POSITION OF MARINE SEISMIC SOURCES

(75) Inventor: Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 31 days.

(21) Appl. No.: 12/773,301

(22) Filed: May 4, 2010

(65) Prior Publication Data

US 2010/0214869 A1   Aug. 26, 2010

Related U.S. Application Data

(63) Continuation of application No. 12/194,926, filed on Aug. 20, 2008, now Pat. No. 7,738,317, which is a continuation of application No. 11/055,169, filed on Feb. 10, 2005, now abandoned.

(51) Int. Cl.
    *G01V 1/38* (2006.01)
(52) U.S. Cl. ............................................. 367/17; 367/16
(58) Field of Classification Search .................... 43/9.7, 43/43.13; 114/242, 244–246, 253; 367/15–18, 367/20, 106
    See application file for complete search history.

(56) References Cited

U.S. PATENT DOCUMENTS

| | | | |
|---|---|---|---|
| 4,724,788 A | | 2/1988 | Ayers |
| 4,729,333 A | * | 3/1988 | Kirby et al. ............... 114/244 |
| 5,357,892 A | * | 10/1994 | Vatne et al. .............. 114/244 |
| 5,532,975 A | * | 7/1996 | Elholm ................... 114/244 |
| 6,234,102 B1 | | 5/2001 | Russell et al. |
| 2002/0064089 A1 | | 5/2002 | Ambs |

FOREIGN PATENT DOCUMENTS

| | | |
|---|---|---|
| EP | 0 168 959 | 1/1986 |
| EP | 0168959 | 1/1986 |
| GB | 1551635 A | 8/1979 |
| GB | 2 400 662 | 10/2004 |
| GB | 2400662 | 10/2004 |
| WO | WO 9740645 A1 | 10/1997 |
| WO | WO 0161380 A2 | 8/2001 |
| WO | WO 0204985 A2 | 1/2002 |
| WO | WO02/47968 | 6/2002 |
| WO | WO 02/47968 | 6/2002 |
| WO | WO 2004092771 A2 | 10/2004 |
| WO | WO 2005096018 A1 | 10/2005 |

OTHER PUBLICATIONS

"Definition of junction from Oxford Dictionaries Online," Oxford University Press, 2011. Downloaded from http://oxforddictionaries.com on Oct. 14, 2011.*
UK Search Report dated Jun. 29, 2006, for Application No. GB 0602546.4.
UK Search Report dated Jun. 29, 2006 for Application No. GB0602546.4.

* cited by examiner

*Primary Examiner* — Jack W Keith
*Assistant Examiner* — Daniel L Murphy

(57) ABSTRACT

Apparatus and methods are described for remotely controlling position of marine seismic equipment. One apparatus comprises a source connected to a tow member; and an adjustment mechanism connected to the source and the tow member, the adjustment mechanism adapted to actively manipulate an angle of attack of the source. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

13 Claims, 10 Drawing Sheets

APPARATUS AND METHODS FOR CONTROLLING POSITION OF MARINE SEISMIC SOURCES

CROSS-REFERENCE TO RELATED APPLICATIONS

The present document is a continuation of U.S. patent application Ser. No. 12/194,926, filed Aug. 20, 2008 now U.S. Pat. No. 7,738,317 which, in turn, is a continuation of U.S. patent application Ser. No. 11/055,169, filed Feb. 10, 2005 now abandoned.

BACKGROUND OF THE INVENTION

1. Field of Invention

The present invention relates to the field of marine seismic instruments and methods of controlling same. More specifically, the invention relates to apparatus and methods for remotely controlling the position of marine seismic instrumentation, as well as related systems, methods, and devices.

2. Related Art

Marine seismic exploration investigates and maps the structure and character of subsurface geological formations underlying a body of water. For large survey areas, a single vessel may tow one or more seismic sources and one or more seismic streamer cables through the water. Alternatively, a tow vessel may either be a "pure" source vessel (meaning it only tows seismic sources) or a "pure" streamer (receiver) vessel, in which case two or more vessels may be used. In any case the seismic sources may comprise compressed air guns or other means for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Three-dimensional (3-D) seismic surveys of a grid provide more information regarding the subsurface formations than two-dimensional seismic surveys. 3-D surveys may be conducted with up to twelve or more streamers that form an array covering a large area behind the vessel. The streamers typically vary in length between three and twelve kilometers. Tail buoys attached at the streamer distal ends carry radar reflectors, navigation equipment, and acoustic transponders. Hydrophones are positioned along each streamer. The in-line interval between each receiver, or receiver group, ranges between about 3 and 25 meters, with 12.5 meters comprising typical interval spacing.

Since the grid is often much wider than the array, the tow vessel must turn around and tow the array in laps across the grid, being careful not to overlap or leave large gaps between the laps across the grid.

A multiple streamer array requires deflectors near the vessel to pull the streamers outwardly from the direct path behind the seismic tow vessel and to maintain the transverse or crossline spacing between individual streamers. The same is true for multiple sources being towed behind a tow vessel when no streamers are present. Deflectors rely on hydrodynamic lift created by forward motion through the water to pull the streamers and/or sources outwardly and to maintain the transverse position relative to the vessel path.

In 4-D geophysical imaging, a 3-D seismic survey is repeated over a grid that has been previously surveyed. This series of surveys taken at different times may show changes to the geophysical image over time caused, for example, by extraction of oil and gas from a deposit.

It is important that the source members being used to generate the acoustical pulses be located as closely as possible to the same location as in previous surveys over the same grid. This has been difficult to accomplish in a marine survey because the acoustical source members are typically towed behind the tow vessel in source arrays, which are subject to wave and current movement.

In addition to the deployment and operation difficulties associated with towing multiple streamers and/or multiple source arrays, conventional techniques limit the ability to position source arrays and streamers in different relative positions and orientations. Source array design is limited by the tow configuration. Each towed source array is also subject to crosscurrents, wind, waves, shallow water, and navigation obstacles that limit the coverage provided by the survey system.

Attempts to control the location of seismic sources and source arrays have included attaching distance ropes running to lateral passive deflectors and tow cables; use of active (steerable) deflecting members attached to the source tow cables in front of the source arrays, or mid-way or at the aft end of the source arrays; and use of passive lateral deflectors equipped with a winch located near the front of the source. WO2004092771 A2, published Oct. 28, 2004, (the '771 application) discloses the latter two options. By attaching one or more steerable deflecting members to the front, rear, or mid-section of one or more source arrays, or a winch to the front of the source that acts on a passive lateral deflector, the source array locations may be controlled. Another method and device employs a source array comprising a rigid bar mounted under a rigid or semi-rigid float member, with the seismic source members, for example air-guns, hanging below the rigid bar. FIGS. 1A and 1B illustrate plan and side-elevation views, respectively, of this source array 100. Source array 100 comprises a rigid steel or aluminum member 8 rigidly mounted to a rigid or semi-rigid float 10, which floats near surface 12 of the ocean or other water body. Multiple source members 14 are hung by chains or other means 16 from member 8, and source array 100 is towed behind a seismic vessel (not shown) by a strength-taking source umbilical 2 that is attached to a tow bridle having two elements, a front element 4 attached to a front 5 of member 8, while a second bridle element 6 is attached proximate a mid-section 7 of member 8. The lengths of bridle elements 4 and 6 determines the orientation, or so-called angle of attack of member 8 and float 10 toward the incoming flow, F. Therefore, member 8 and float 10 function as a low aspect ratio hydrofoil creating lateral lift that enables source array 100 to be laterally deflected. However, this method and apparatus offers no possibilities for remotely adjusting the angle of attack.

The previous attempts have not provided optimal control of the location of the source arrays under towing conditions. While these techniques are improvements in the art, further improvement is desired.

SUMMARY OF THE INVENTION

In accordance with an embodiment of the present invention, a method is provided which comprises towing a seismic source employing a source tow member connected to a tow vessel. The method further comprises remotely controlling an angle of attack of a deflector coupled to the source by a deflector tow member. The control is achieved with no direct mechanical connection between the tow vessel and the deflector while the deflector is positioned laterally from the source during seismic surveying.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible.

The present invention relates to various apparatus, systems and methods for controlling position of one or more marine seismic components. The terms "controlling position", "position controllable", "remotely controlling position", "remotely adjustable", and "steering" are generally used interchangeably herein, although it will be recognized by those of skill in the art that "steering" usually refers to following a defined path, while "controlling position", "position controllable", and "remotely controlling position" could mean steering, but also could mean merely maintaining a relative position, for example relative to one or more reference points, such as natural or man-made objects, or merely deflecting an object. As "position controllable" and "controlling position" are somewhat broader terms than "steering", these terms are used herein, except when specific instances demand using more specific words. One aspect of the present invention relates to position controllable apparatus. Other aspects of the present invention, which are further explained below, relate to methods for remotely controlling or adjusting position of marine seismic sources.

Figure 2A:
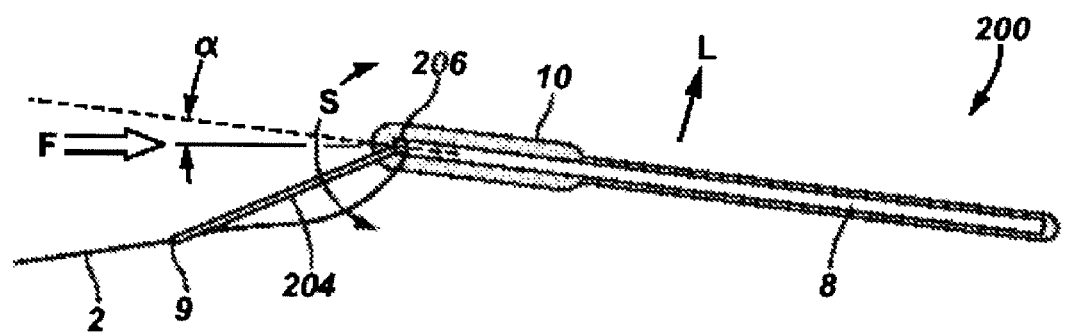
FIGS. 2A and 2B illustrate schematic plan and side-elevation views, respectively, of a first position controllable marine seismic apparatus and method of the invention.
Figure 2B:
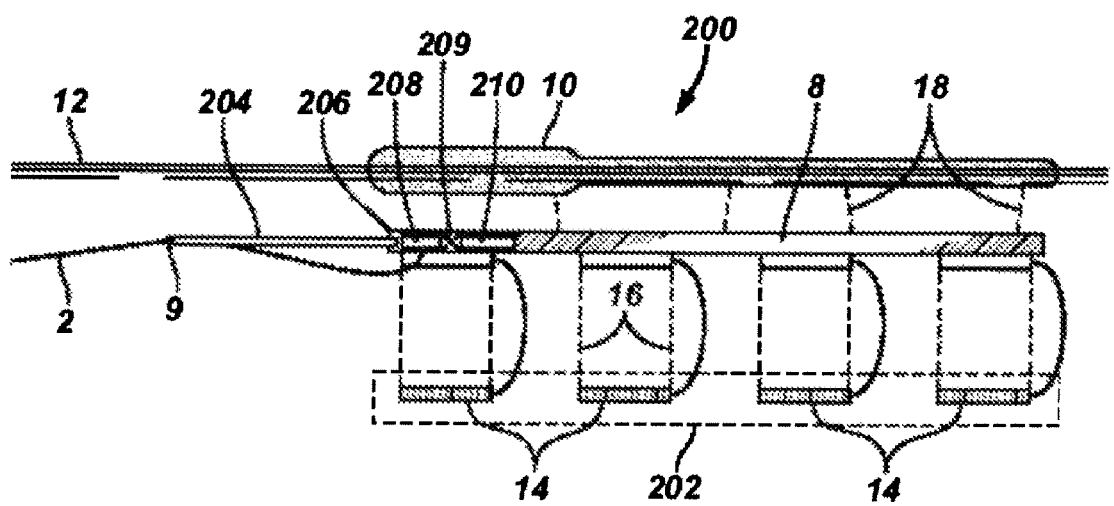

As an example, FIGS. 2A and 2B illustrate plan and side-elevation views, respectively, of a first position controllable marine seismic source array 200 and method of the invention. (The same numerals are used throughout the drawing figures for the same parts unless otherwise indicated.) Source array 200 comprises a plurality 202 of source members 14, for example compressed air guns, which are fired to generate acoustical waves that are reflected from the subsurface geological features back to receivers (not shown) during a seismic exploration. Source members 14 may be other acoustical-wave generation device, such as explosives, percussion devices, and the like. Source array 200 is towed after a seismic vessel (not illustrated) with a strength-taking umbilical 2. Source members 14 may be suspended from chains or other means 16 beneath a plate, beam or similar member 8 that is rigid in at least the lateral plane. Member 8 is in turn suspended from chains or other means 18 beneath a float 10, or alternatively fixed tightly to float 10. Float 10 may be flexible, semi-flexible or rigid. A rigid body 204, illustrated in FIGS. 2A and 2B as a solid cylindrical rod (although other shapes are possible), is fixed to member 8 by a swivel connection 206, which may be a hinge, ball joint, or other type of equivalent function joint. Swivel connection 206 allows rigid body 204 to swing side-to-side as illustrated by double-headed arrow, S, in FIG. 2A. Alternatively, rigid body 204 may comprise a frame (as depicted in and further explained in relation to FIGS. 6A-6C) or some other structure able to swing and able to transfer moment from umbilical 2 to member 8. An actuator 208 may be actuated by a motor, 209, which is in turn controlled by a local controller 210 to ensure that swivel connection 206 comprises a stiff connection and adjusts swing position, S, of rigid body 204 based on one or more signals given from a vessel or other signal source (not illustrated) through strength-taking umbilical 2. As rigid body 204 swings, the orientation of a tow-point changes. The tension from strength-taking umbilical 2 is transferred into a moment on member 8 that causes source array 200 to position itself with an angle of attack ($\alpha$) with respect to incoming flow, F. This positioning, and change of position, causes source array 200 to position or re-position itself, typically laterally, although other movements are possible.

Figure 3:
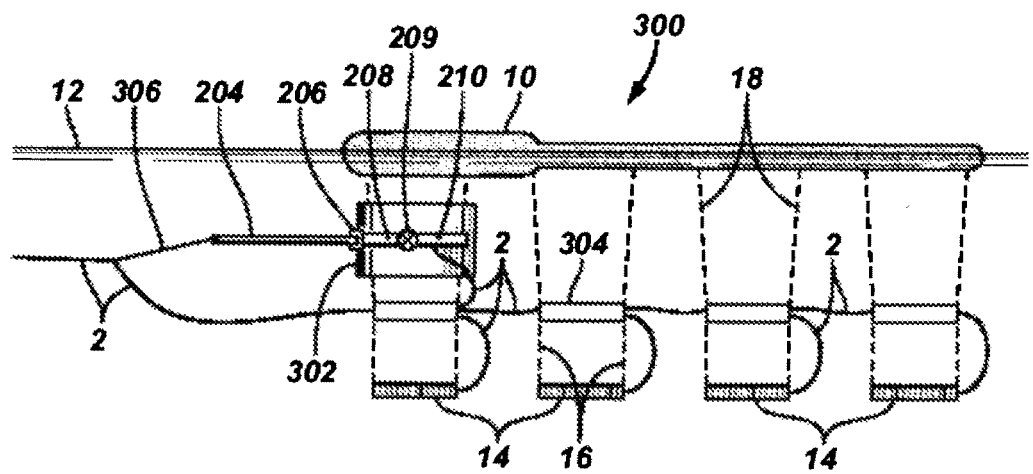
FIG. 3 illustrates a schematic side-elevation view of a second position controllable marine seismic apparatus and method of the invention.

FIG. 3 illustrates a schematic side-elevation view of a second position controllable marine seismic source array 300 and method of the invention. Comparing embodiment 300 with embodiment 200 of FIG. 2, note that member 8 in FIG. 2 is replaced with a plate or hydrofoil-shaped body 302 having a higher aspect ratio (ratio between height and length) that may result in better deflection performance. However, note that deflection of member 302 need not be identical to the deflection of the source array it is associated with, that is, the angle of attack of plate or hydrofoil 302 may be different than the angle of attack of the source array. This is true whenever a deflection member has a length different than the length of the source member. Plate or hydrofoil-shaped body 302 is illustrated as suspended between float 10 and a hang plate 304, however, body 302 could also be in front of or behind float 10 and source members 14. Swivel connection 206 is provided, as in embodiment 200 of FIG. 2, as are actuator 208, motor 209, local controller 210, and rigid body 204, which may be mounted onto plate or hydrofoil-shaped body 302 using any suitable means, such as bolts, screws, weldments, and the like. A towing harness 306 connects strength-taking umbilical 2 and rigid body 204.

Figure 4:
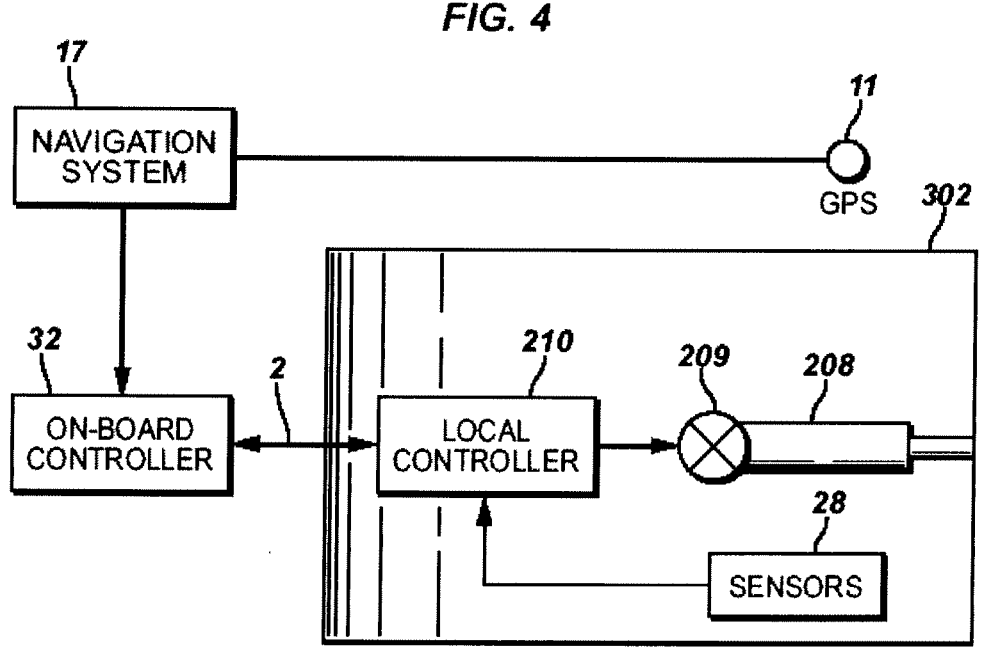
FIG. 4 is a schematic diagram of a process control scheme useful in the present invention for controlling position of seismic sources using the apparatus and systems of the invention.

FIG. 4 is a schematic diagram of a control scheme useful with all apparatus and methods of the present invention, for example those depicted in FIGS. 2A-2B, 3, 5A-5B, 6A-6C, 10, 11A-11F, and is not limited to any particular apparatus or method of the invention. A positioning unit 11, mounted for example on source array 200 (FIG. 2A) transmits position of source array 200 to a navigation system 17 located on the tow vessel (not illustrated). Navigation system 17 provides the location information received from positioning unit 11 to an on-board controller 32. On-board controller 32 may be a computer, a distributed control system, an analog control system or other control device known to those having ordinary skill in the art. On-board controller 32 may communicate with a local controller 210 through umbilical 2, but may alternatively communicate through a wireless transmission. Umbilical 2 contains conductors for providing power and control signals to and from plate or hydrofoil-shaped body 302. Local controller 210 sends a signal to an electric motor 209 that moves actuator 208, which in turn moves plate or hydrofoil-shaped body 302. When plate or hydrofoil-shaped body 302 moves, the lateral force imparted against it by the water steers source array 200 to the desired position. Sensors 28 may detect the angular position of plate or hydrofoil-shaped body 302 and send this information back to local controller 210 and, optionally, to on-board controller 32 where it may be displayed for an operator to read.

Figure 1A:
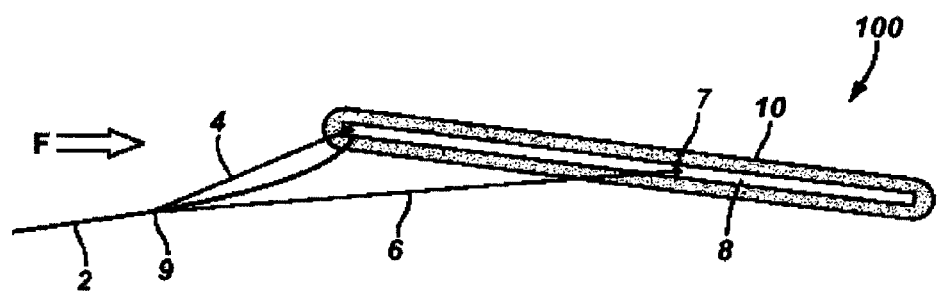
FIGS. 1A and 1B illustrate schematic plan and side-elevation views, respectively, of a prior art marine seismic steering apparatus and method.
Figure 1B:
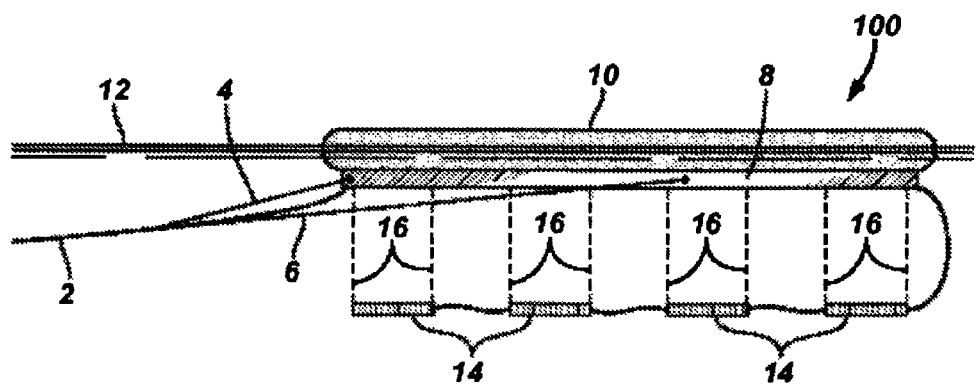
Figure 5A:
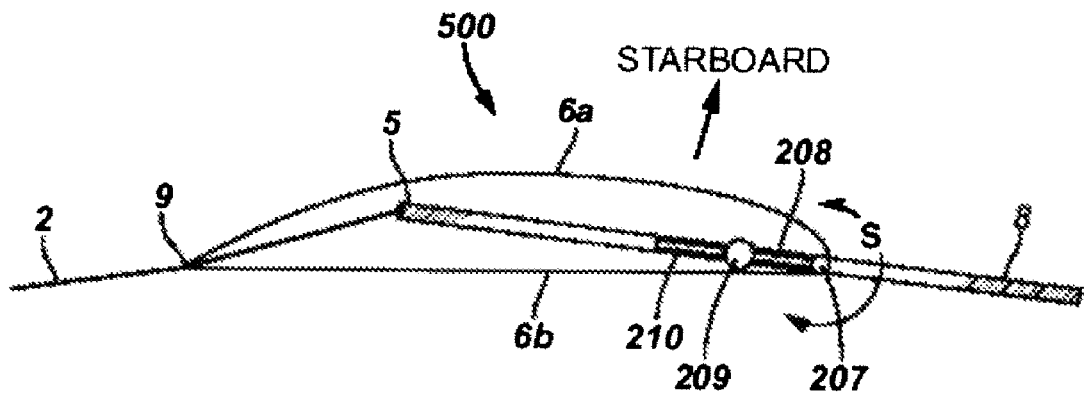
FIGS. 5A-5C illustrate schematic plan views of position controllable marine seismic apparatus and methods of the invention employing bridle systems as part of the adjustment mechanism.
Figure 5B:
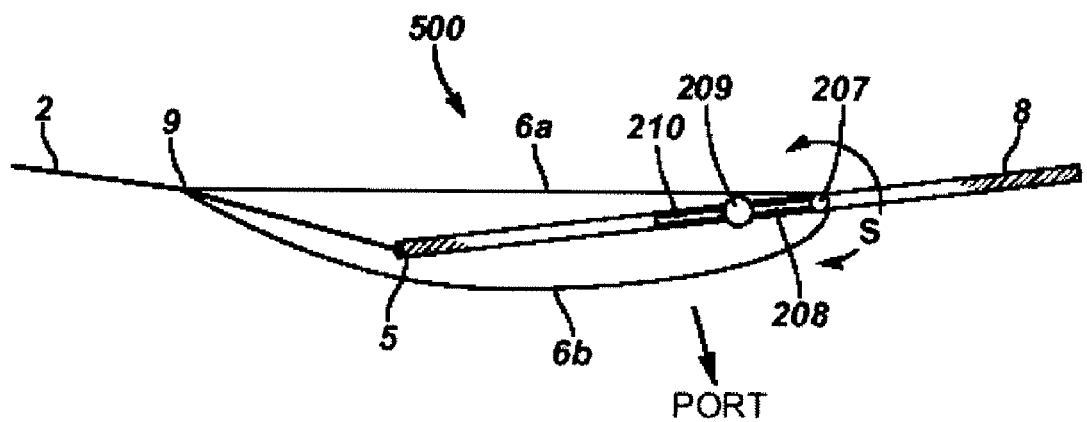
Figure 5C:
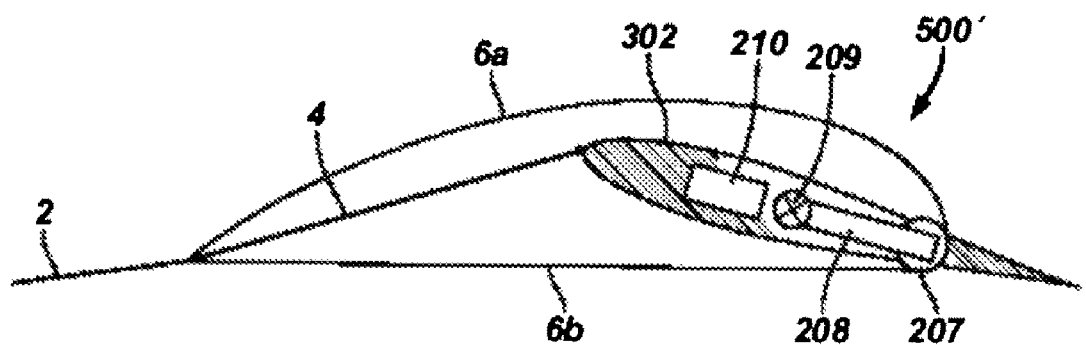

FIGS. 5A and 5B illustrate schematic plan views of a third position controllable marine seismic apparatus 500 and method of the invention. Apparatus 500 builds on prior art apparatus 100 depicted schematically in FIG. 1, modified to make the bridle system remotely adjustable. A source array, illustrated by member 8 only, is towed behind a seismic vessel (not illustrated) by strength-taking umbilical 2. A bridle system comprised of a front bridle leg 4 and aft bridle legs 6a and 6b is used in order to achieve the desired angle of attack of member 8. Bridle legs 4, 6a, and 6b may be the same or different in composition and may be wires, cables, ropes, or any other material that can function as described. Each of bridle legs 4, 6a, and 6b are connected to strength-taking umbilical 2 at a point 9. Front bridle leg 4 connects to member 8 at a front point 5 and is substantially always taut. Aft bridle legs 6a and 6b are routed through member 8 in a loop as illustrated in FIGS. 5A and 5B. Position control (starboard or port, as illustrated by the labeled arrows) is achieved by maintaining one of bridle legs 6a and 6b taut (6a is taut in port position, 6b is taut in starboard) while its complement bridle leg is slack. Positioned on member 8 approximately at its mid-section (could be anywhere along member 8) is a rotatable member 207, for example a motor- or winch-driven pulley or equivalent functioning means, that acts on bridle legs 6a and 6b so as to rotate member 8 as illustrated by double-headed arrow S in order to achieve the desired angle of attack. A local controller 210 that communicates with an on-board controller 32 (FIG. 4) on the seismic vessel through umbilical 2 controls a motor 209, which in turn moves actuator 208, and rotatable member 207. Alternatively, rather than a motor- or winch-driven rotatable actuator, one may simply employ a linear actuator, for example an electric, hydraulic or pneumatic jack connected to a point between bridle legs 6a and 6b to maintain one leg taut. Another alternative to using a rotatable actuator would be to use a pair of linear actuators, for example a pair of hydraulic or pneumatic piston/cylinder actuators, one each directly on bridle legs 6a and 6b, similar to the arrangement illustrated in and discussed below in relation to FIG. 6C, which illustrates a high aspect ratio plate or hydrofoil. The arrangement of embodiment 500 of FIG. 5A may be employed as well with a high aspect ratio plate or hydrofoil as depicted schematically in FIG. 5C. This figure illustrates embodiment 500', including a high aspect ration plate or hydrofoil 302 moved to starboard deflecting position. All other elements in embodiment 500' of FIG. 5C are equivalent to those of embodiment 500 depicted in FIG. 5A except that bridle legs 6a and 6b may be shorter in embodiment 500' than in embodiment 500. The same alternative arrangements may be employed in embodiment 500' as were discussed in relation to embodiment 500 of FIGS. 5A and 5B, including replacing the rotatable actuator with a linear actuator, employing a frame, and employing a pair of linear actuators.

Figure 6A:
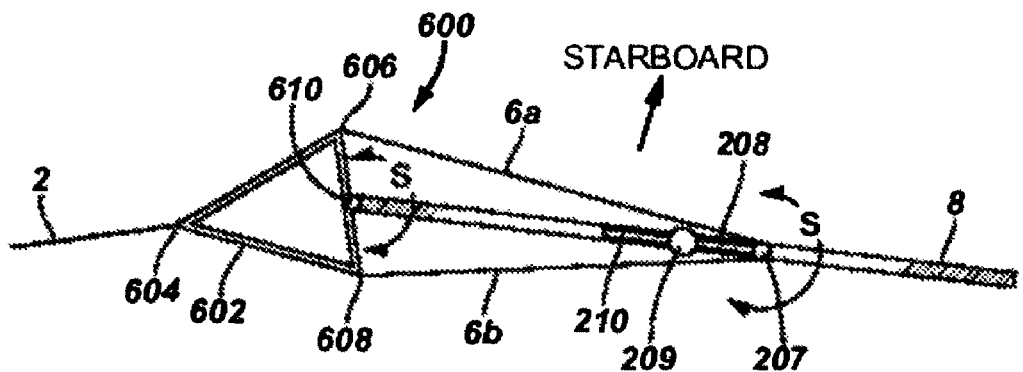
FIGS. 6A-6C illustrate schematic plan views of position controllable marine seismic apparatus and methods of the invention employing frames as part of the adjustment mechanism.
Figure 6B:
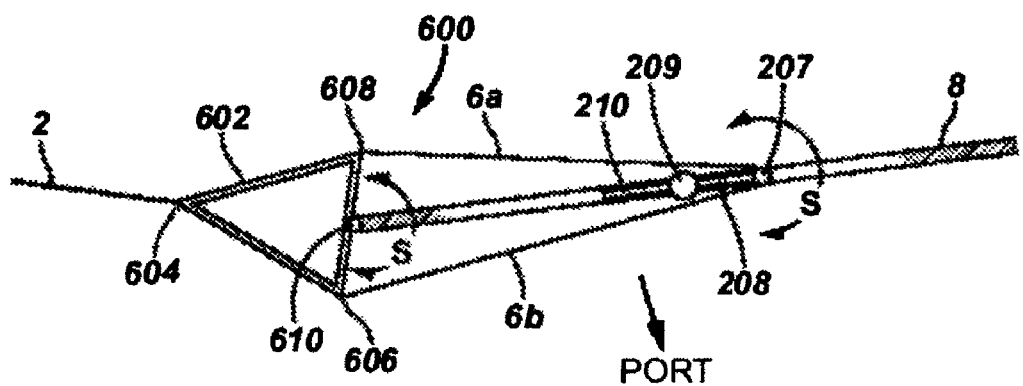
Figure 6C:
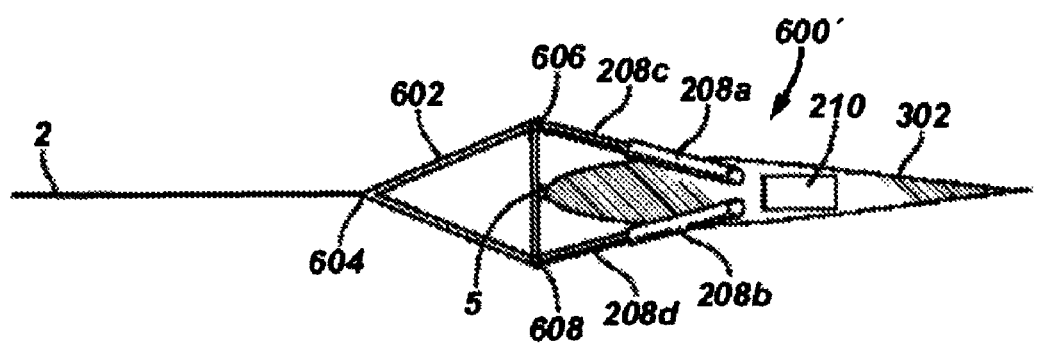

FIGS. 6A and 6B illustrate schematic plan views of a fourth position controllable marine seismic apparatus 600 and method of the invention. An adjustable bridle system comprising bridle legs 6a and 6b, rotating member 207, actuator 208, motor 209, and local controller 210 are illustrated, with both bridle legs 6a and 6b remaining substantially taut. Bridle legs 6a and 6b are connected to a stiff frame 602 at points 608 and 606, respectively, and to strength-taking umbilical 2 at point 604, via stiff frame 602, so that frame 602 may pivot about a swivel joint 610, which may be a hinge, ball joint, or other equivalent function joint, positioned at front end of member 8. An alternative (not shown) is to replace the combination of rotating member 207, actuator 208, and motor 209 with a linear actuator as discussed above in relation to FIGS. 5A and 5B. Another alternative is to replace bridle legs 6a and 6b with linear actuators, but closer to the frame 602, as illustrated in schematic plan view in embodiment 600' of FIG. 6C. Embodiment 600' includes a pair of piston/cylinder actuators 208a and 208b. Cylinder 208a is attached to plate or hydrofoil 302, while its corresponding piston 208c is attached to frame 602 at point 606. Similarly, cylinder 208b is attached to plate or hydrofoil 302 and piston 208d is attached to frame 602 at point 608.

Figure 7:
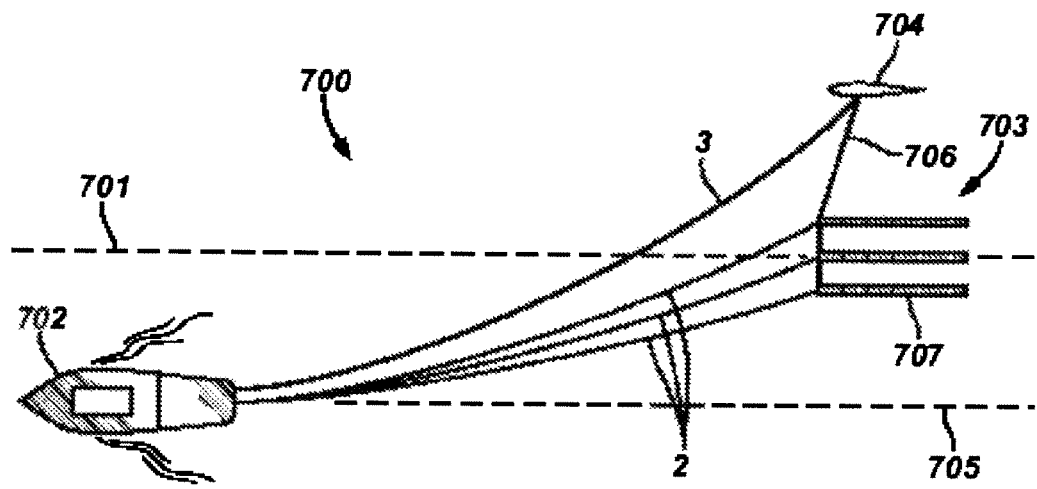
FIG. 7 illustrates a schematic aerial plan view of a system of the invention.

Referring now to FIG. 7 there is illustrated a schematic plan view of a marine seismic system 700 and method of the invention. Illustrated schematically is a tow vessel 702 following a desired path, which may be straight or curved, and one seismic source 703 of a dual seismic source (the other source not shown) showing a line of symmetry 705 between the two sources. Source 703 comprises three passive, non-steerable source arrays 707, each source array 707 connected to tow vessel 702 through its own strength-taking umbilical 2, and a deflector 704 that is connected to seismic source 703 through an umbilical 706. Alternatively umbilical 706 may be a passive, strength-taking member such as a rope, wire, or equivalent passive connector, while deflector 704 is towed by use of a separate strength-taking umbilical 3. Many arrangements are possible, and are discussed separately and in detail in reference to FIGS. 11A-F. By adjusting its angle of attack, deflector 704 changes its lateral position, and this change in position deflects seismic source 703 away from or back to a path 701 (shown as straight but could be curved), as desired by the seismic survey team. In case of a dual source system, there would be one source/deflector system as shown in FIG. 7 on each side of the symmetry line 705. In case of a single source system (see FIGS. 11A-F) the source is positioned with its center at the symmetry line 705 and with one deflector on each side enabling positioning to either side of the symmetry line.

Deflectors useful in the invention may be any type of deflector able to adjust its angle of attack, including so-called free-flying deflectors, and non-free-flying deflectors that have streamers or other trailing, drag-producing means. As used herein the term "free-flying" means a deflector that is towed but does not have suspended to its tail end a streamer or other drag-producing device. In some situations it might be desired to include a stabilizing tow member to an otherwise free-flying deflector.

Figure 8:
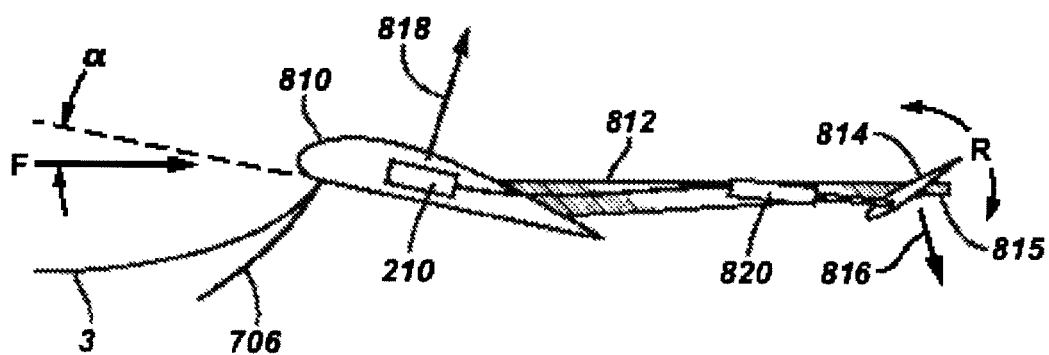
FIG. 8 illustrates a prior art wing-type deflector useful in the invention.

FIG. 8 illustrates a schematic cross-section view of a prior art free flying deflector 800 useful in the invention known under the trade designation "MONOWING", available from WesternGeco L.L.C., Houston, Tex. This particular embodiment of the deflector includes a main hydrofoil 810, a boom 812 rigidly fixed to main hydrofoil 810, and a so-called boom-wing 814 mounted near a rear end 815 of boom 812. By rotating boom-wing 814 as depicted by double-headed arrow R, it creates lift force in either positive or negative direction. As illustrated in FIG. 8 a negative lift force 816 is achieved. However, this lift translates into a moment that translates into a change of the orientation of main hydrofoil 810. The orientation, or angle of attack $\alpha$, of main hydrofoil 810 is important, as the lift force 818 of main hydrofoil 810 is directly proportional to $\alpha$, and proportional to the square of the magnitude of the inflow velocity (indicated by arrow F). An actuator 820 that communicates with a local controller 210 may adjust the orientation of boom-wing 814. Communication with tow vessel 702 (FIG. 7) is available through any of the combinations of strength-taking umbilicals and non-strength-taking umbilicals discussed herein (see discussion of FIGS. 11A-F). Local controller 210 may also communicate with on-board controller 32 (FIG. 4) and/or other remote controller(s) via wireless transmission. Deflectors useful in the invention may be suspended from or attached rigidly to a float on the sea surface.

Figure 9:
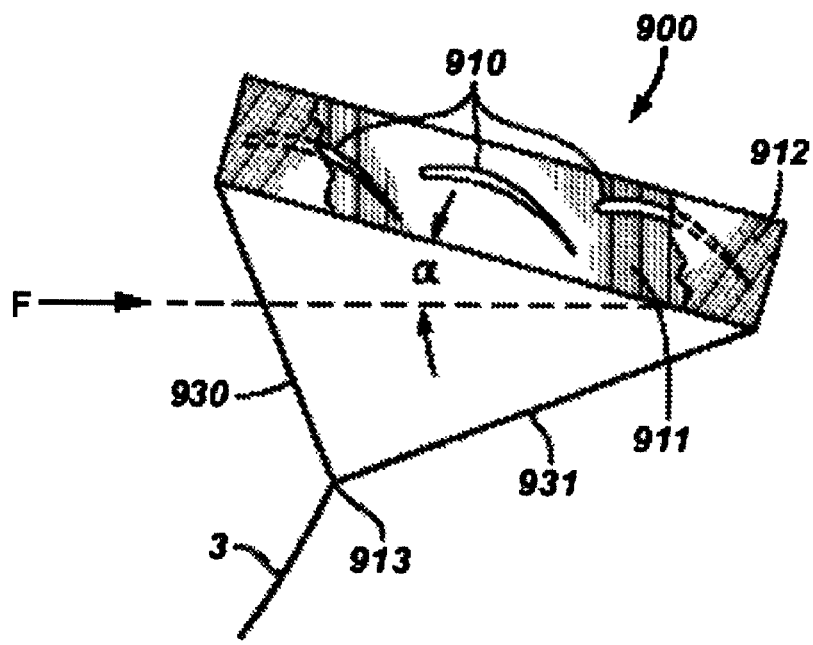
FIG. 9 illustrates a schematic plan view, with portions cut away, of a prior art door-type deflector.

FIG. 9 illustrates a schematic plan view, with portions cut away, of a prior art, so-called "door" deflector 900. This deflector is often used to deflect a marine seismic source to a nominal position. Three passive hydrofoils 910 (only the top ends of which are viewable in this view) are suspended between a pair of plates, a top plate 912 and a bottom plate 911, the latter of which is viewable through the portions of top plate 912 that are cut away. In three dimensions this comprises an array of hydrofoils with end plates 912 and 911 at the top and bottom of each hydrofoil 910. A towing bridle or harness comprising four legs is required: a front leg 930 and an aft leg 931 are illustrated attached to top plate 912. Two additional bridle legs 930' and 931', one forward and one aft, attach to bottom plate 911 but are not shown in this view. All four bridle legs come together in one point 913. Attached to bridle legs 930/931 ( and to the two additional bridal legs) is a passive, strength-taking tow member 3, from which door 900 is towed by a tow vessel. The angle of attack a of door 900 is referenced to the inflow water velocity vector, F, approaching door 900 and the relative lengths between the front and aft bridle legs determine the angle $\alpha$. As position of door 900 is a function of the angle of attack, $\alpha$, the position of the door is not remotely adjustable.

Figure 10:
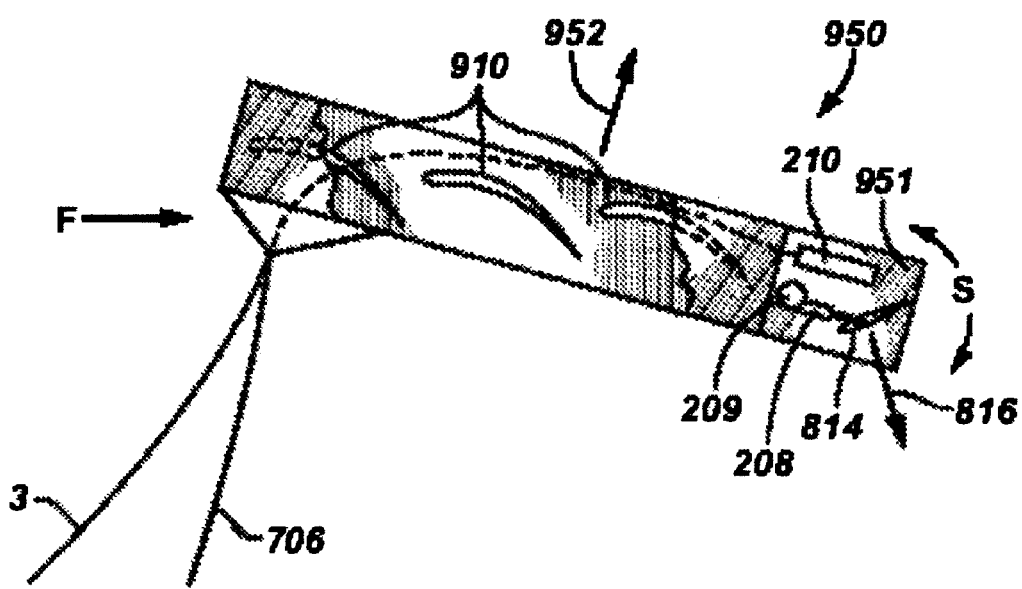
FIG. 10 illustrates a schematic plan view, with portions cut away, of the door-type deflector of FIG. 9 modified in accordance with the invention.

FIG. 10 illustrates a schematic plan view, with portion cut away, of a door-type deflector 950 of the invention, which is similar to deflector 900 of FIG. 9, but modified in accordance with the invention to make its angle of attack remotely controllable. Aft bridle legs are not required, and a unit 951 is included that includes a hydrofoil 814 with similar function as boom-wing 814 of FIG. 8. The function of hydrofoil 814 is not to produce lift as the hydrofoils 910 (FIG. 9), but to create a smaller lift force 816 that causes modified door 950 to orient itself with the desired angle of attack a relative to incoming water flow velocity vector, F. As the total lift 952 is a function of angle of attack $\alpha$, total lift 952 may be adjusted by adjusting the orientation and hence the lift of hydrofoil 814. The angle of attack (orientation) of hydrofoil 814 may be adjusted by an actuator 208 that is operatively coupled to a motor 209 and local controller 210. Local controller 210 may communicate with on-board controller 32 (FIG. 4) on the tow vessel through strength-taking umbilical 3, or through umbilical 706 and strength-taking tow-member 2 (not illustrated). Local controller 210 may also communicate with on-board controller 32 and/or other remote controller(s) via wireless transmission.

FIGS. 11A-11F illustrate six non-limiting embodiments of how one may arrange active, strength-taking tow members, passive strength-taking tow members, and umbilicals (recall as defined herein an umbilical is non-strength-taking unless indicated otherwise). In each of FIGS. 11A-11F, tow vessel 702 and seismic source 703 are indicated as being connected by a strength-taking umbilical 2. It will be understood that the functions of strength-taking umbilical 2 could be divided into a passive, strength-taking tow member and an umbilical in each of FIGS. 11A-11F.

Figure 11A:
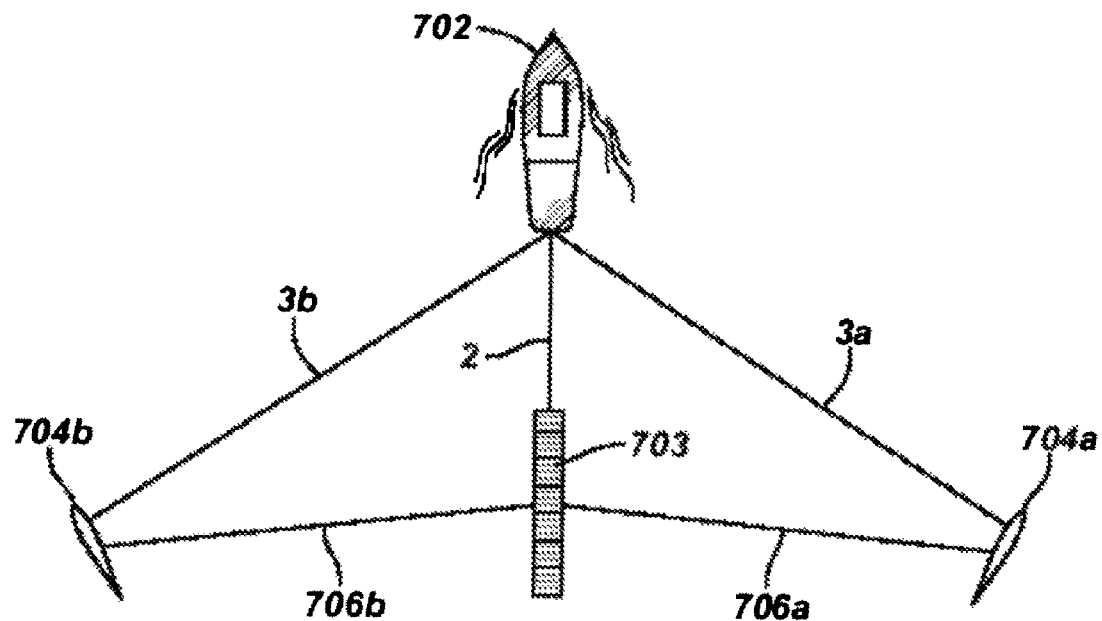
FIGS. 11A-11F are simplified schematic diagrams illustrating six non-limiting alternative tow member arrangements.

FIG. 11A illustrates an embodiment wherein a tow vessel 702 tows a single seismic source 703 and deflectors 704a and 704b. Tow vessel 702 and each deflector 704a and 704b are connected using respective passive, strength-taking tow members 3a and 3b. Source 703 is connected with deflectors 704a and 704b using respective active, strength-taking tow members 706a and 706b.

Figure 11B:
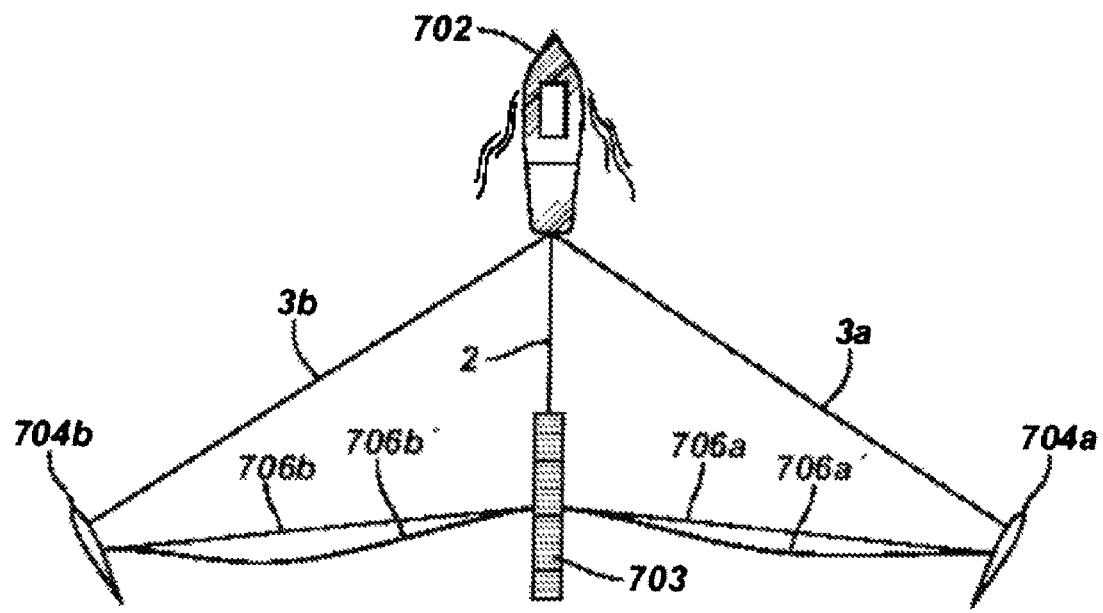

FIG. 11B illustrates an embodiment identical to that of FIG. 11A except that active, strength-taking tow members 706a and 706b are replaced by a combination of passive, strength-taking tow members 706a and 706b and umbilicals 706a' and 706b'.

Figure 11C:
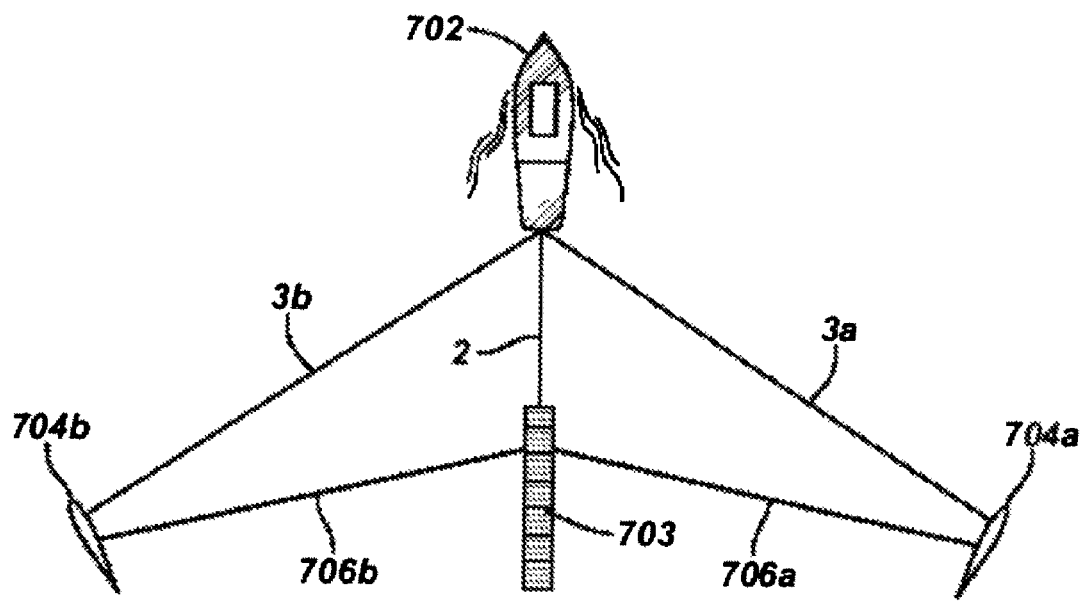

FIG. 11C illustrates an embodiment that might be viewed as the reverse of that of FIG. 11A. Tow members 3a and 3b are now active, strength-taking tow members, while tow members 706a and 706b are passive, strength-taking tow members.

Figure 11D:
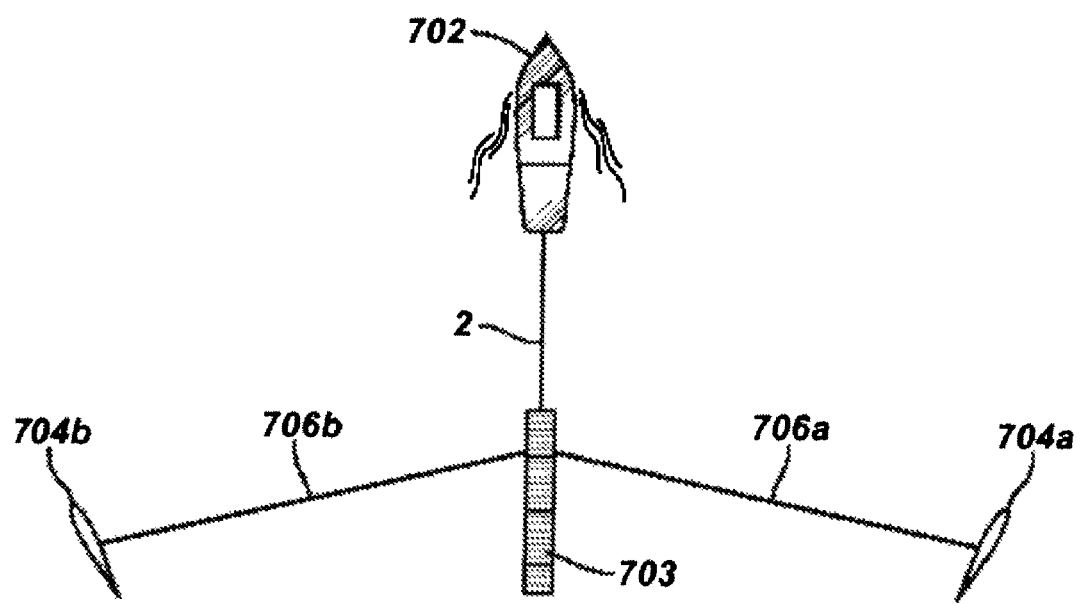

FIG. 11D illustrates an embodiment where there is no direct mechanical connection between tow vessel 702 and deflectors 704a and 704b. In this embodiment active, strength-taking tow members 706a and 706b connect source 703 with deflectors 704a and 704b, respectively. The deflectors in this case are remote controlled either through communications links in 706a, 706b, and 2' or through wireless transmission.

Figure 11E:
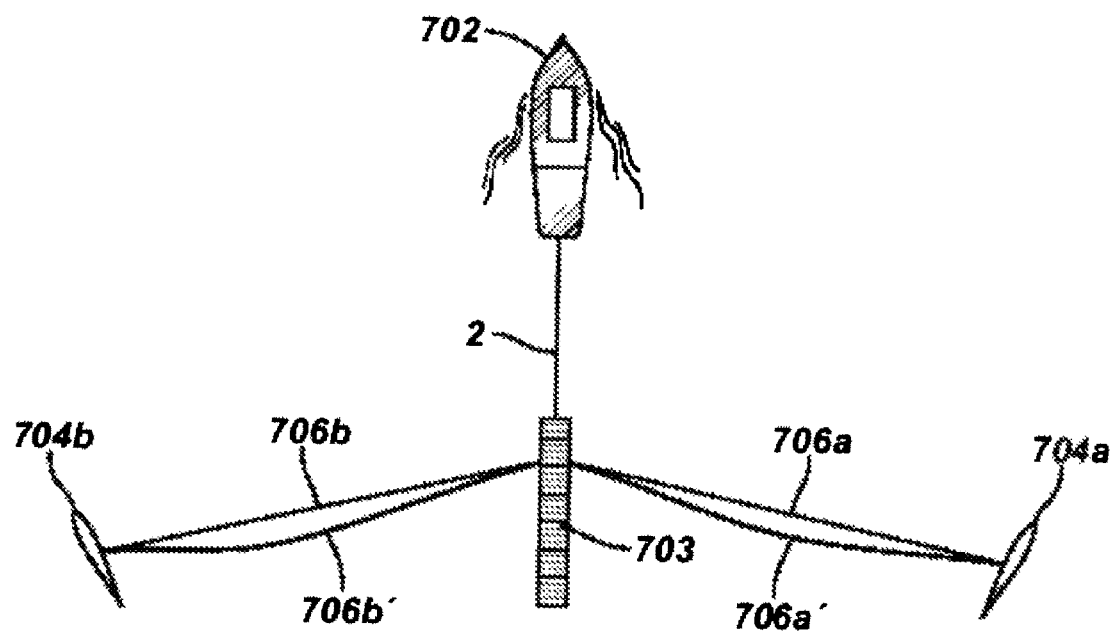

FIG. 11E illustrates another embodiment where there is no direct mechanical connection between deflectors and tow vessel. Passive, strength-taking tow members 706a and 706b connect between deflectors 704a and source 703, and deflector 704b and source 703, respectively. Umbilicals 706a' and 706b' provide power and optionally communication and data transmission links, and may include other utilities such as compressed air, and the like.

Figure 11F:
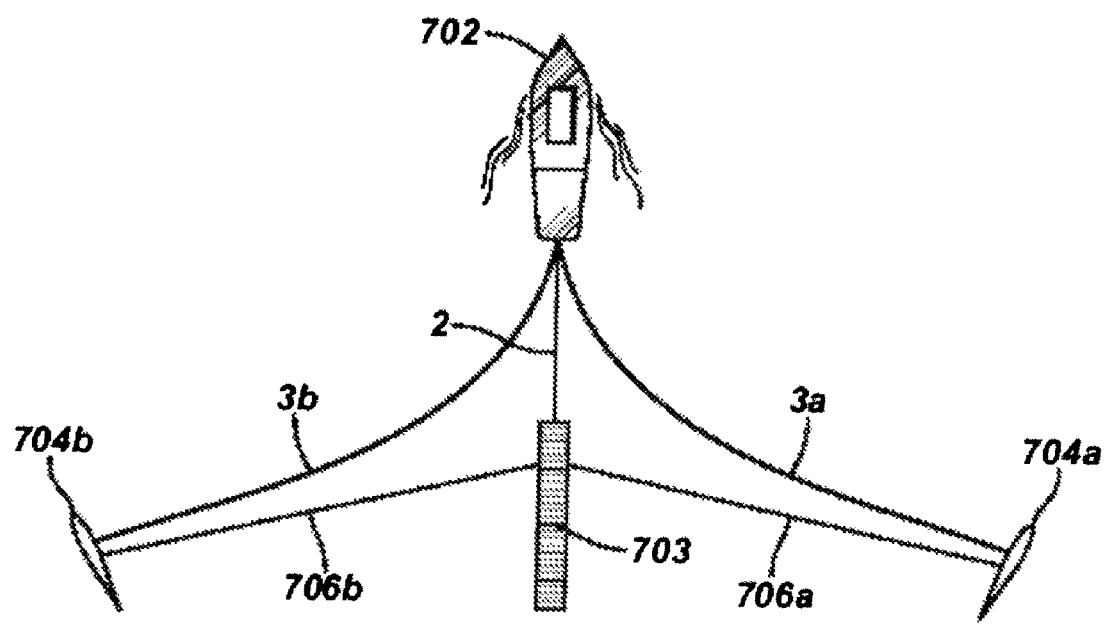

FIG. 11F illustrates an embodiment where source 703 tows deflectors 704a and 704b through passive, strength-taking tow members 706a and 706b, respectively. Umbilicals 3a and 3b function as power and, optionally, communications links between deflectors 704a, 704b, respectively and tow vessel 702.

In use the position of a deflecting member on a source, or deflector associated with a source via umbilicals and/or passive tow cables, is actively controlled by GPS or other position detector sensing the position of the source or deflector and feeding this data to a navigation system. Navigation may be performed on board a tow vessel, on some other vessel, or indeed a remote location. By using a communication system, either hardwire or wireless, information from the remote controller is sent to one or more local controllers on deflectors and/or deflecting members of sources. The local controllers in turn are operatively connected to adjustment mechanisms comprising motors or other motive power means, and actuators on the deflectors and/or deflecting members, which function to move a wing, plate or hydrofoil, or a bridle system, depending on the adjustment mechanism used. This in turn adjusts the angle of attack of the deflector or deflecting member, causing it to move the source as desired. Feedback control may be achieved using local sensors on the deflectors or deflecting members, which may inform the local and remote controllers of the position of a swivel connector, a wing or hydrofoil, the angle of attack of a deflector or wing or hydrofoil of a particular boom wing, a position of an actuator, the status of a motor or hydraulic cylinder, the status of a bridle system, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method comprising:
   towing a seismic source using a source tow member connected to a tow vessel;
   coupling a deflector directly to the seismic source with no direct mechanical connection between the deflector and the tow vessel such that the deflector is positioned laterally from the seismic source without being positioned ahead of the seismic source during seismic surveying; and
   remotely controlling an angle of attack of the deflector connected to the seismic source.

2. The method of claim 1 wherein the remote controlling is performed through a deflector tow member, which is a strength-taking umbilical connecting the deflector to the source.

3. The method of claim 1 comprising using a local controller on the deflector to communicate with an on-board controller to obtain an acquired a value with respect to the angle of attack.

4. The method of claim 3 comprising comparing the acquired value to a desired value and adjusting the deflector accordingly.

5. The method of claim 4 further comprising adjusting the deflector using an actuator mounted on the deflector.

6. The method of claim 5 further comprising controlling the actuator using a local controller mounted on the deflector.

7. The method of claim 6 further comprising sending a signal from the tow vessel to the local controller and sending a signal from the local controller to the actuator.

8. A method of remotely steering a marine seismic source comprising:
   towing a source array using a source tow member connected to a tow vessel;
   towing a deflector using a separate deflector tow member coupled directly between the deflector and the tow vessel, the deflector positioned laterally from the source array during seismic surveying; and
   remotely controlling an angle of attack of the deflector using a strength-taking umbilical connecting the source and the deflector, wherein the deflector tow member is a passive strength-taking tow member.

9. The method of claim 8 comprising using a local controller on the deflector to communicate with an on-board controller to obtain an acquired a value with respect to the angle of attack.

10. The method of claim 9 comprising comparing the acquired value to a desired value and adjusting the deflector accordingly.

11. The method of claim 10 further comprising adjusting the deflector using an actuator mounted on the deflector.

12. The method of claim 11 further comprising controlling the actuator using a local controller mounted on the deflector.

13. The method of claim 12 further comprising sending a signal from the tow vessel to the local controller and sending a signal from the local controller to the actuator.

* * * * *